United States Patent

Azar et al.

[11] 3,910,846
[45] Oct. 7, 1975

[54] METHOD OF PREPARING ELECTROSCOPIC TONER PARTICLES

[75] Inventors: Jack C. Azar, Rochester; Thomas R. Hoffend, Webster; Jerome E. Martin, Red Creek, all of N.Y.

[73] Assignee: Xerox Corporation, Stamford, Conn.

[22] Filed: Feb. 22, 1974

[21] Appl. No.: 446,196

Related U.S. Application Data

[62] Division of Ser. No. 211,132, Dec. 22, 1971.

[52] U.S. Cl. ........ 252/62.1 P; 96/1 SD; 260/29.2 E; 260/29.2 R
[51] Int. Cl.² .......................................... G03G 9/10
[58] Field of Search ............... 252/62.1 P, 62.1 L; 96/1 SD, 1 LY; 260/29.2 E, 29.2 R

[56] References Cited
UNITED STATES PATENTS

| | | | |
|---|---|---|---|
| 2,022,004 | 11/1935 | Larson | 260/29.2 R |
| 2,086,903 | 7/1937 | Ellis | 260/29.2 R |
| 2,334,107 | 11/1943 | Light et al. | 260/29.2 R |
| 2,378,230 | 1/1945 | Little | 260/29.2 R |
| 2,634,245 | 4/1953 | Arndt | 260/29.2 E |
| 3,108,085 | 10/1963 | Broadhead | 260/29.2 E |
| 3,223,659 | 12/1965 | Curtice et al. | 260/29.2 E |
| 3,310,512 | 3/1967 | Curtice | 260/29.2 E |
| 3,326,848 | 6/1967 | Clemens et al. | 260/29.2 TN |
| 3,361,846 | 1/1968 | Gleim et al. | 260/860 |
| 3,709,846 | 1/1973 | Tsou | 260/29.2 E |

OTHER PUBLICATIONS

Goodings, S.C.I. Monograph No. 13, "Thermal Degradation of Polymers," 1961, pages 214–219.

*Primary Examiner*—Norman G. Torchin
*Assistant Examiner*—John R. Miller
*Attorney, Agent, or Firm*—James J. Ralabate; Donald C. Kolasch; Ernest F. Chapman

[57] ABSTRACT

A method is provided for emulsifying polyesters comprising admixing under high shear agitation a polyester having an acid content of at least about 0.02 milliequivalents per gram of polyester with sufficient aqueous basic solution to render the pH of the resulting latex at least about 8.

14 Claims, No Drawings

METHOD OF PREPARING ELECTROSCOPIC TONER PARTICLES

This is a division of application Ser. No. 211,132 filed Dec. 22, 1971.

This invention relates to polyesters. More particularly, this invention relates to methods of emulsifying polyesters and to the stable polyester emulsions thus obtained.

Electrostatography is perhaps best exemplified by the process of electrophotography as first described in U.S. Pat. No. 2,297,691 to C. F. Carlson. In this process a photoconductor is first given a uniform electrostatic charge over its surface and is then exposed to an image of activating electromagnetic radiation which selectively dissipates the charge in illuminated areas of the photoconductor while charge in the non-illuminated areas is retained thereby forming an electrostatic latent image. The electrostatic latent image is then developed or made visible by the deposition of finely divided, electroscopic marking material, referred to in the art as toner, on the surface of the photoconductor, which marking material conforms to the pattern of the electrostatic latent image. The visible image may then be utilized in a number of diverse ways. For example, the image may be viewed in situ on the photoconductive insulator, fixed in place on the photoconductive insulator or transferred to a second surface such as a sheet of paper and fixed in place thereon as desired depending upon whether the photoconductive insulating material is reusable as is the case with amorphous selenium photoconductive insulators or non-reusable as is the case with particulate zinc oxide-binder film type electrophotographic plates.

The electroscopic marking materials or toners have generally been prepared by thoroughly mixing a softened resin and pigment to form a uniform dispersion as by blending these ingredients in a rubber mill or the like and then pulverising this material to form it into small particles. Most frequently, this division of the resin-pigment dispersion has been made by jet pulverization of the material. Recently, improved methods of electrostatographic toner production have been developed. For example, U.S. Pat. No. 3,326,848 to C. F. Clemens et al. describes a spray drying process for producing toner particles with significantly improved uniformity of particle size. Basically this process consists of blending a latex of the desired toner resin with a colorant and then spray drying this combined system to the desired particle size. The spray drying step consists of atomizing the colorant-water latex blend into small droplets, mixing these with a gas and holding the droplets in suspension in the gas until evaporation dries off the liquid in the droplets and heat and surface tension forces cause the resin particles in each droplet to coalesce encasing the colorant included in that droplet.

Although toners may be spray dried from solution, aqueous latex systems are most desirable. In latex systems, water is used as the vehicle in which the polymer and pigment are suspended thereby providing several advantages over solvent systems. The aqueous system is inexpensive, non-toxic, non-contaminating to the atmosphere, non-explosive and amenable to removal in the spray drying system.

Many polymers useful for toner applications can readily be made into an aqueous latex form. However, many polymers cannot. For example, condensation polymers such as polyesters generally fall into this latter classification. Some polyesters have been found to form toner materials exhibiting improved fusing capabilities. Most importantly, these polyesters exhibit high blocking temperatures and low melt viscosities. These polyesters are also generally triboelectrically stable under varying humidity conditions. Still further, these polyesters provide toners which are resistant to mechanical attrition during the development process. Efforts to prepare latices from such polyesters, however, have met with only limited success.

It is therefore a principal object of this invention to provide methods whereby polyester latices may be prepared.

It is another object of this invention to provide polyesters in a form suitable for spray drying or freeze drying.

It is another object of this invention to enable the preparation of polyester toner particles.

It is still another object of the present invention to provide processes for the preparation of polyesters which are readily emulsifiable.

Generally polymers are formed into latices by either emulsion polymerization wherein the polymer is generated in a latex form during the course of the polymerization itself or by so called "post-emulsification" procedures wherein the polymer is subsequently emulsified with the aid of emulsifiers in a high speed mixer. It is an object of this invention to provide processes whereby polyesters may be post-emulsified to form polyester latices for use, for example, in the preparation of spray dried or freeze dried toners.

These as well as other objects are accomplished by the present invention which provides a method for post-emulsifying polyesters to form stable polyester latices comprising admixing under high shear agitation a polyester having an acid content of at least about 0.02 milliequivalents per gram of polyester with sufficient aqueous basic solution to render the pH of the resulting latex above at least about 8.

Polyesters are most conveniently prepared by either direct condensation of a dibasic acid and a dihydric alcohol, by the transesterification of a diester and a dihydric alcohol or by condensation of an hydroxy acid. Examples of such reactions are presented below:

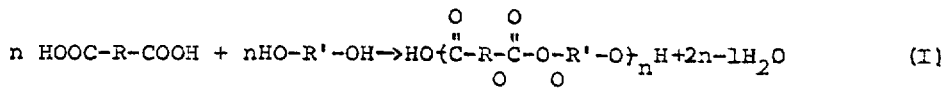

$$n\ \text{HOOC-R-COOH} + n\text{HO-R'-OH} \rightarrow \text{HO}\{\overset{O}{\overset{\|}{C}}\text{-R-}\overset{O}{\overset{\|}{C}}\text{-O-R'-O}\}_n\text{H} + 2n-1\text{H}_2\text{O} \qquad (I)$$

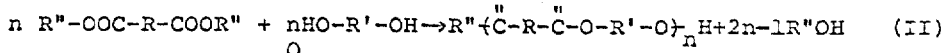

$$n\ \text{R''-OOC-R-COOR''} + n\text{HO-R'-OH} \rightarrow \text{R''}\{\overset{O}{\overset{\|}{C}}\text{-R-}\overset{O}{\overset{\|}{C}}\text{-O-R'-O}\}_n\text{H} + 2n-1\text{R''OH} \qquad (II)$$

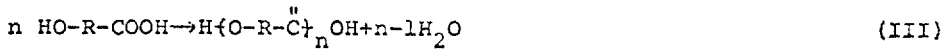

$$n\ \text{HO-R-COOH} \rightarrow \text{H}\{\text{O-R-}\overset{O}{\overset{\|}{C}}\}_n\text{OH} + n-1\text{H}_2\text{O} \qquad (III)$$

The termination of such polyester chains may either be by an acid, hydroxyl or ester function. It has been found in accordance with the present invention that it is the acid groups whether as terminal and/or pendant groups that directly affect the emulsifiability of a polyester. Specifically, it has been found that polyesters containing pendant acid groups therein and/or acid end groups can be readily emulsified upon reaction of said acid groups with a basic solution. Polyesters that contain hydroxyl or ester groups or even acid groups, if said acid groups are not sufficiently reacted with base, do not emulsify to an acceptable latex.

It has also been found that polyesters that contain either hydroxyl or ester termination can be thermally degraded in a controlled manner to form the required acid-containing polyesters. Thermal degradation provides a controllable means of regulating the acid content of polyesters. Polyesters pretreated in this manner have been found to be readily emulsifiable upon reaction with a basic solution in accordance with the present invention. This controlled degradation does not result in any significant physical or chemical changes in the polyester other than the conversion of the hydroxyl or ester end groups to acid end groups. Generally, controlled degradation can be obtained by heating the polyester at temperatures above the melting point, generally ranging from at least about 200°C., to below the degradation temperature of the polyester. This will, of course, vary with the particular polyester employed. Heating is continued until the desired acid content is obtained. Depending upon the nature of the particular polyester and the temperature employed, heating can be continued for from about 1 to about 2 hours.

The acid groups in the polymer whether present initially in the molecule or formed by the controlled degradation described hereinabove need not be limited to carboxylic acid groups. Instead the acid group can be any acid group such as carboxylic, phosphonic, sulfonic and/or their metal salts. In the event the metal salts of these acids are employed, the need for admixture with a basic solution is reduced and may even be eliminated. However, the pH of the resulting emulsion must still be at least about 8, and preferably, at least about 10 in order to obtain a stable emulsion. These acid groups may be chemically attached to the polymer molecule by means well known in the art. For example, these groups may be present on the starting monomers used to form the polymer or they can be grafted to the polymer after polymerization.

In order to be rendered emulsifiable in accordance with the present invention the polyester must have a minimum acid content of at least about 0.02 milliequivalents per gram of polyester. Any lesser amount of acid has been found insufficient to enable satisfactory emulsification to be obtained. Of course, higher quantities of acid groups can be contained in the molecule; however, higher acid concentration requires greater usage of the basic solution for adequate reaction. Preferably, the acid content ranges from about 0.05 to about 1.5 milliequivalents per gram of polyester.

Emulsions of the present invention can be prepared by admixing the polyesters described hereinabove with an aqueous basic solution containing sufficient base to completely react with the acid groups contained in the polymer molecules and convert said groups to the corresponding salts. In order to insure complete emulsification, it has been found necessary to employ sufficient base to maintain the pH of the resulting emulsion above at least about 8. Emulsions prepared in this manner especially those brought to a pH of at least about 10, exhibit excellent stability, i.e., exhibit no noticeable settling upon standing for at least 24 hours. The emulsions prepared in accordance with the present invention exhibit a particle size distribution of from about 0.1 micron to about 10 microns with over 90 percent of the particles being below about 2 microns. Generally the average particle size within the emulsion is less than about 0.5 microns. The emulsions are stable for at least up to about 24 hours and are easily reformed by agitation when separation has occurred. It has been found, however, that control over the particle size can be conveniently obtained by varying the shear rate and duration of agitation.

The polyesters useful in the present invention can be either crystalline or amorphous polyesters exhibiting an acid content of at least about 0.02 milliequivalents per gram of polyester. The polyesters can be of varying molecular weight. For toner purposes, it has been found that polyesters of relatively low molecular weight are preferred. Polyesters exhibiting a molecular weight ($\overline{M}_w$) less than about 20,000 are most preferred.

Illustrative polyesters are poly (xylylene sebacate), poly (diethylene glycol terephthalate), poly (1,2 propylene isophthalate), poly (hexamethylene sebacate), poly (1,2 propylene terephthalate), the condensation product of 1,2 propylene glycol, hydroquinone di-($\beta$-hydroxyethyl)ether and terephthalic acid or an ester thereof, the propylene glycol adduct of bisphenol A condensed with terephthalic, isophthalic or phthalic acid and copolymers thereof with propylene glycol, and the like.

Generally, the polymer emulsions are formed by reducing the melt viscosity of the polymer to about 300 poise or less. This can be accomplished by heating or by addition of a diluent. The resulting fluid polymer can then be admixed with an aqueous basic solution under high shear agitation thereby forming an emulsion of the polymer in a continuous aqueous phase. Upon cooling, the dispersed polymer phase solidifies to form a colloidal suspension. When the viscosity of the polymer is reduced by heating, it is considered preferable in order to avoid oxidation to heat the polymers under an inert atmosphere of, for example, argon, nitrogen and the like.

If desired, the viscosity can also be lowered by adding a small quantity of diluent to the polyester. It has been found that a polymer-diluent mixture containing up to about 50% by weight of diluent can be satisfactorily emulsified. When, however, the diluent is employed in amounts greater than about 50%, the resulting emulsion was found to be an emulsion, principally of the diluent in the aqueous phase. Any solvent which swells or partially dissolves the polymer can be employed. Preferably, chlorinated hydrocarbons such as chloroform, dichloroethane, and the like or aromatic hydrocarbons such as benzene, toluene and the like are employed. The polymer-diluent mixture can be heated to further reduce the viscosity.

The formation of emulsions in accordance with the present invention requires the input of large amounts of energy to form the interface between the two phases and to work against the internal friction of the system. This energy can be supplied by conventional emulsification equipment with high power ratings. For example, simple mixers, colloid mills, homogenizers and the like can be suitably employed to provide the necessary high shear agitation needed to effect emulsification. Generally, high shear agitation greater than about 5000 rpm is required.

It has been found helpful to incorporate a surfactant in the emulsion in order to improve the stability thereof, e.g., for storage purposes. Although any type of surfactant, ionic, or non-ionic can be employed, it has been found that the most stable emulsions are formed when the interfacial film is charged by use of an ionic emulsifier. Typical ionic surfactants which have been found useful in the present invention are sodium alkylaryl sulfates, sodium lauryl sulfate, sodium alkylnaphthalene sulfonate, the sodium salt of an alkylaryl polyether sulfonate, dioctyl sodium sulfo succintate, blends of ionic and non-ionic surfactants such as polyoxyethylene sorbitan esters of fatty resin acids and alkylaryl sulfonates and the like. Illustrative of typical non-ionic surfactants which can be employed for stabilization of the emulsifications of the present invention are polyoxyethylene sorbitan monopalmitate, polyoxyethylene sorbitan monostearate, polyoxyethylene sorbitan monooleate, sorbitan monostearate and the like.

Other additives can also be employed to further increase stability. For example, conventional thickeners can be incorporated in the emulsion to inhibit creaming and thereby increase stability. Creaming is the separation of the emulsion into two unequal emulsions. Although such separation is undesirable, it is reversible and with agitation the original emulsion can be regenerated. Generally creaming in an emulsion can be decreased when the droplet size of the colloidal particles is small and/or the viscosity of the continuous phase is high. Thus, the use of thickeners increases the viscosity of the continuous phase and reduces the creaming tendency. High viscosity solutions also appear to result in smaller particle size, possibly due to increased shear effects.

Suitable thickeners for use in the present invention are hydroxyethyl cellulose, polysaccharide gums and the like. The preferred thickeners are generally of the hydroxyethyl cellulose type, but can vary in terms of molecular weight. It has been found in accordance with the present invention that the higher molecular weight thickeners produce the best particle size emulsion where other parameters are held constant. Thickener can be added in amounts of from about 0.5% to about 10% thickener based on the weight of polymer. Preferably, however, especially with high molecular weight thickeners, from about 2 to about 5% thickener has been found satisfactory.

It is considered preferable in accordance with the present invention to emulsify the polymer from the melt. This can be conveniently done by heating the polymer or the polymer-diluent mixture to a pour point of less than about 300 poise under a blanket of an inert gas such as argon, nitrogen or the like. Water containing a sufficient amount of base to render the pH of the resulting emulsion above at least about 8 is heated to the boiling point and agitated at high speed such as in a Waring blender or other high shear agitation device. The fluid polymer is slowly added to the aqueous solution and agitation is continued. It has been found that emulsification occurs essentially instantaneously. The emulsions are of the oil in water type. Maximum particle size is generally 10 microns or less with the average particle size being less than about 0.5 microns. No phase separation is observable for at least 24 hours.

Typically, the procedure for preparing emulsions is as follows: water is heated with agitation to the boiling point, a thickener can then be added and allowed to disperse and dissolve, then a surfactant can be added to improve the stability of the emulsion. If desired, antifoaming agents such as polysiloxanes as, for example, polydimethylsiloxanes and the like, can also be added to inhibit foaming attributable to the surfactant. Lastly a base such as sodium hydroxide, potassium hydroxide or the like is added. These materials are allowed to dissolve with agitation. The particular order in which these components are added is not considered critical although it is considered preferable to add the thickener first and allow it to completely dissolve before adding the other components. Simultaneously with the preparation of the aqueous solution, the polyester is brought to a viscosity of 300 poise or less by heating or use of a diluent as described above. The aqueous solution is then placed in a pre-heated mixer and high shear agitation is commenced. The fluid polymer is poured slowly into the agitated solution. The emulsion thus formed in continually agitated at a temperature of at least about 90° C. for a sufficient period of time to form the desired particle size, generally from about 2 to about 10 minutes. The particular time of mixing is dependent upon the sample size and the emulsion apparatus employed. The emulsion can then be cooled.

If desired, the colorant, e.g., dyes or pigments, which is added to the toner to impart color to the developed electrostatic latent images can be incorporated directly into the emulsion at the time of emulsification. For example, carbon black can be added to the emulsion simultaneously with the preparation thereof by either suspending the carbon black in the aqueous phase or in the molten polymer phase. It has been found, however, that better emulsions exhibiting smaller particle size are obtained when the carbon black is admixed directly with the molten polymer. Upon the addition of the colorant, it is considered important that the pH of the emulsion be maintained above at least about 8 which may necessitate further addition of base to compensate for any effect on the pH of the addition of the colorant. Upon reduction of the pH below about 10, it has been found that the emulsion begins to separate and the particles agglomerate. The toner particles thus obtained can contain from about 3 to about 20% by weight of a colorant.

Although not wishing to be bound by any theory or mechanism, it is currently believed that the acid salt moieties formed in the polymer chain act as the emulsifier or surfactant for the polymer molecule. It has been found that emulsification in accordance with the present invention is dependent upon the proper pH with a pH greater than at least about 10 being necessary for a good and stable emulsion to be formed. By controlled degradation of polyesters, it is possible to convert hydroxyl or ester end groups to acid end groups without appreciably affecting the molecular weight of the polymer. With heating, the acid content of the polymer increases significantly and the hydroxyl or ester content decreases.

The following examples further illustrate the present invention. Unless otherwise stated, all percentages and parts are by weight.

EXAMPLE 1 - 3

The following examples illustrate the usefulness of controlled degradation occasioned by heating the polyester for converting ester and/or hydroxyl terminated polyesters to acid terminated polyesters without appreciably decreasing the molecular weight of the polymer. Additionally, the importance of the pH in obtaining a stable emulsion is demonstrated.

As summarized in Table I below, three samples of a copolyester of the condensation product of 1,2 propylene glycol, hydroquinone di (β-hydroxyethyl ether) and dimethyl terephthalate (80/20/100 molar ratio), having a molecular weight ($\overline{M}_w$) of 4050 and having essentially no initial acid content were heated at 250°C. under a nitrogen blanket for differing periods of time resulting in the formation of polymers of differing acid contents but the same molecular weight. After heating, 22.5 grams of each of the polymers was emulsified by being added to an aqueous basic solution under high shear agitation. The basic solution comprised:

| | |
|---|---|
| 180 | grams water |
| 0.36 | grams Triton X-200, anionic surfactant manufactured by Rohm & Haas, a sodium salt of an alkyl aryl polyether sulfonate |
| 0.2 | gram Antifoam B, a silicone defoamer manufactured by Dow Corning |
| 0.25 | gram Natrosol 250 HR, a high molecular weight hydroxyethyl cellulose thickener, manufactured by the Hercules Powder Company |
| 3.0 | cc of a 5% NaOH solution |

The aqueous solution was heated to boiling under high shear agitation. The molten polymer was added over a period of one minute and the emulsion was subsequently agitated for four minutes. The amount of base present was sufficient to neutralize an acid content of up to 3.75 milliequivalents of acid but insufficient to completely neutralize any larger acid content.

It can be seen from Table I that the sample which was sufficiently basic to exhibit a pH of at least 10 formed the best emulsion in terms of stability. The amount of base present was sufficient to completely react with all the acid groups contained in the sample that was heated the longest, but was insufficient to additionally raise the pH of the resulting emulsion above 8; hence, this sample exhibited the lowest pH and formed an incomplete and unstable emulsion.

Thus, it can be seen that when there is (1) sufficient reaction of the chain end acid groups with a base resulting in (2) a basic solution with a pH above about 8, a good emulsion results. If, however, insufficient base is present to effect substantially complete reaction of the chain end acid groups, a poor emulsion or no emulsion results. It can also be seen that when the pH is at least about 10, a good emulsion is obtained exhibiting excellent stability.

able, it must possess, either initially or through controlled degradation, a minimum acid content. It has been found that this minimum acid content is at least about 0.02 milliequivalents per gram of polymer. At acid concentrations below said amount, there is insufficient acid salt formed in the polymer to impart sufficient emulsifier or surfactant properties to the polymer to cause complete emulsification. Apparently, upon controlled degradation through heating, the molecular weight of the polymer is not appreciably effected. Instead the hydroxyl chain end groups are converted to carboxyl chain end groups.

A polyester of the type described in Examples 1–3, but having a molecular weight of 1081 and being substantially totally terminated by hydroxyl groups was subjected to controlled degradation as described in Examples 1–3 for 1 hour giving rise to an acid content in the polymer of 0.96 milliequivalents per gram of polymer. Attempts were made to emulsify the polymer before and after heating employing the emulsification procedure described in Examples 1–3 using sufficient base to completely react with the acid end groups when present and to raise the pH of the emulsion above 10. The results are summarized in Table II below.

TABLE II

| Example | Acid Content Thermometric Analysis (milliequivalents/gm) | Molecular Weight($\overline{M}_n$) | Time of Heating (hrs.) | Emulsion Characteristics |
|---|---|---|---|---|
| 4 | 0 | 1081 | 0 | No emulsion formed |
| 5 | 0.96 | 1081 | 1.0 | Stable over 24 hrs. |

EXAMPLE 6

This example illustrates the emulsification of a polyester wherein a small amount of a sulfonic acid salt moiety was introduced into the polymer chain during polymerization.

A transesterification reaction was conducted by charging to an agitated reactor, 342 grams (4.5 moles) of 1,2-propane diol (~50% molar excess), 547 grams (2.82 moles) dimethyl terephthalic acid, 53.3 grams (0.18 moles) of sodium dimethyl-5-sulfo-isophthalate and 1000 ppm (based on equimolar amounts of diol and diacid) of lead acetate hydrate ($Pb(OAc)_2 \cdot 3H_2O$) catalyst. The reactants were heated to a temperature of 155°–185°C. and the generated methanol was continually removed. The reaction was continued for 7 hours. The polymer was obtained in 88.5% yield and was completely hydroxyl terminated. The polymer exhibited a molecular weight ($\overline{M}_n$) of about 2000 and an acid salt content of 0.09 milliequivalents/gram of polymer.

180 grams of water was heated to boiling in an agitated vessel. 0.36 grams of an anionic surfactant, Triton

TABLE I

| Example | Acid Content Thermometric Analysis (milliequivalents/gm) | Total Milliequivalents | Molecular Weight($\overline{M}_n$) | Time of Heating (hrs.) | pH of Emulsion | Emulsion Characteristics |
|---|---|---|---|---|---|---|
| Control | 0 | 0 | 4050 | 10 min[1] | 12 | No emulsion |
| 1 | 0.08 | 1.80 | 4050 | 0.75 | 10.6 | Stable over 24 hours |
| 2 | 0.12 | 2.70 | 4050 | 1.25 | 8.4 | Separates within 24 hours |
| 3 | 0.13 | 2.93 | 4050 | 1.75 | 7.3 | Poor, incomplete emulsification |

[1]The control sample was melted by heating at 300°C. for about 10 minutes which was sufficient to place the polymer in a molten condition, but insufficient to affect the acid content thereof.

EXAMPLES 4 – 5

The following examples illustrate that if the polymer is almost totally hydroxyl terminated, it will not emulsify, but when some of the chain ends are converted to acid groups, emulsification can then occur. Of course, in order for a given polyester to be rendered emulsifi- X–200, manufactured by the Rohm & Haas Company, a sodium salt of an alkyl aryl polyether sulfonate, 0.2 grams of Dow Corning Antifoam B, a silicone defoamer manufactured by Dow Corning and 0.5 grams of Natrosol 250 HR, a high molecular weight hydroxyethyl cellulose thickener manufactured by the Hercules Powder Company, were all added to the agitated water and were completely dispersed and dissolved. No sodium hydroxide was added because of the initial presence of the sodium acid salt in the polymer chain.

25 grams of the polyester prepared as described above was heated to a molten pourable condition by heating at 250°C. under a nitrogen blanket. The polymer was slowly added to the aqueous solution which was being agitated under high shear conditions. The polymer emulsified immediately. The pH of the resulting emulsion was above 8.

EXAMPLES 7–10

The following examples illustrate that although a surfactant can be used in the present invention to improve the stability of the emulsion, use of surfactants alone are insufficient to effect emulsification. Emulsification of polyesters can only be effected in accordance with the present invention by completely reacting the acid groups in the polyester with base and raising the pH of the emulsion above about 8.

EXAMPLE 7

A polyester of the type employed in Examples 1–3 and having an acid content of 0.05 milliequivalents per gram of polyester was admixed with 1,2-dichloroethane diluent in a weight ratio of polyester to diluent of 3:1 to form a paste. The paste was heated to a temperature of about 150°C. until a constant melt viscosity below 300 poise was obtained.

Concurrently, 0.714 grams of Triton X–200, an anionic surfactant, was admixed with 200 grams of water which was heated to the boiling point. The surfactant solution was placed in a Waring Blender adjusted to maintain the solution near the boiling point of water during high shear agitation. The molten polyester paste was slowly added to the surfactant solution under high shear agitation. No emulsion formed after 10 minutes of continuous agitation.

EXAMPLE 8

A molten polymer paste identical to that described in Example 7 was slowly added to a Waring Blender containing a solution of 2.0 grams of Tween 40, a non-ionic surfactant comprising a polyether of sorbitan monopalmitate, manufactured by Atlas Powder Company, in 200 grams of water. The surfactant solution was maintained at about the boiling point of water and under high shear agitation. Upon addition of the polymer paste, no emulsion formed after 10 minutes of continuous agitation.

EXAMPLE 9

A molten polymer paste identical to that described in Example 7 was slowly added to a Waring Blender containing a solution of 2.0 grams of Atlox–3335, a mixture of nonionic and anionic surfactants comprising a mixture of polyoxyethylene sorbitan esters of fatty acids and an alkyl aryl sulfonate, manufactured by the Atlas Powder Company in 200 grams of water. The surfactant solution was maintained at about the boiling point of water and under high shear agitation. Upon addition of the polymer paste, no emulsion formed after 10 minutes of continuous agitation.

EXAMPLE 10

A molten polymer paste identical to that described in Example 7 was slowly added to a Waring Blender containing a solution of 2.5 grams of sodium hydroxide in 200 grams of water. The basic solution was maintained at about the boiling point of water and under high shear agitation. No surfactant was added to the system. The amount of base was sufficient to completely react with the acid groups in the polymer. Upon addition of the polymer paste, an excellent emulsion formed essentially instantaneously.

EXAMPLE 11

A polyester of the type employed in Examples 1–3 and having an acid content of 0.05 milliequivalents per gram of polyester was charged to a Kadymill in an amount of 160 grams together with 16 grams of Black Pearls L carbon black. The carbon black was dispersed in the polymer at a temperature of 220°C. under a blanket of argon under high speed agitation.

The resulting dispersion of carbon black in the molten polymer was charged to a colloid mill over a period of two minutes and 20 seconds. The colloid mill contained a solution of 850 grams of boiling distilled water, 2.70 grams of Triton X–200 surfactant, 1.50 grams of Antifoam B, 33.8 cc. of 5% NaOH and 1.88 grams of Natrosol 250 HR thickener. An excellent emulsion formed rapidly containing 15.4% solids. Agitation was continued for 9 minutes to insure uniform particle size.

The resulting emulsion containing dispersed carbon black was spray dried in the manner described in U.S. Pat. No. 3,326,848 to form toner particles exhibiting an average particle size of about 7 microns with a geometric standard deviation of 1.5.

An electrostatographic developer composition was prepared by admixing the toner particles prepared above at a 1:300 weight ratio of toner to carrier, the carrier being 450 micron steel beads having a 10% coating thereon of a styrene-methyl methacrylate-vinyl triethoxy silane terpolymer as described in U.S. Pat. No. 3,526,533.

Facsimile copies were obtained employing the above developer composition with a Xerox Model D electrophotographic apparatus (Xerox Corporation, Rochester, N.Y.).

Although specific materials and conditions were set forth in the above exemplary processes in making and using the polyester emulsions of the present invention, these are merely intended as illustrations of the present invention. Various other polyesters, surfactants, antifoam agents, thickeners and the like such as those listed above may be substituted in the examples with similar results.

Other modifications of the present invention will occur to those skilled in the art upon a reading of the present disclosure. These are intended to be included within the scope of this invention.

What is claimed is:

1. A method of preparing electroscopic toner particles comprising forming a fluid polyester having an acid content of about 0.02 milliequivalents to about 1.5 milliequivalents per gram of polyester and exhibiting a viscosity of less than about 300 poise, admixing said fluid polymer with an aqueous basic solution under high shear conditions thereby forming an emulsion; incorporating a coloring agent suitable for imparting color to developed electrostatic latent images and maintaining the pH of the emulsion at least about 8 with said aqueous basic solution, and drying the resulting emulsion to produce the electroscopic toner particles.

2. A method as defined in claim 1 wherein said coloring agent is admixed with the aqueous basic solution.

3. A method as defined in claim 1 wherein said coloring agent is admixed with the fluidized polymer.

4. A method as defined in claim 2 wherein the resulting emulsion is spray dried to form toner particles exhibiting an average particle size of about 7 microns with a geometric standard deviation of about 1.5.

5. Electroscopic toner particles obtained by the process of claim 4.

6. Electroscopic toner particles as defined in claim 5 containing from about 3 to about 20% by weight of a colorant.

7. A method as defined in claim 3 wherein the resulting emulsion is spray dried to form toner particles exhibiting an average particle size of about 7 microns with a geometric standard deviation of about 1.5.

8. Electroscopic toner particles obtained by the process of claim 7.

9. Electroscopic toner particles as defined in claim 8 containing from about 3 to about 20% by weight of a colorant.

10. Electroscopic toner particles of claim 6 admixed with steel carrier beads at about a 1:300 weight ratio of toner to carrier beads to form an electrostatographic developer.

11. Electroscopic toner particles of claim 9 admixed with steel carrier beads at about a 1:300 weight ratio of toner to carrier beads to form an electrostatographic developer.

12. A method as defined in claim 1 wherein the pH of the resulting emulsion is at least about 10.

13. A method as defined in claim 1 wherein the polyester having an acid content of about 0.02 milliequivalents to about 1.5 milliequivalents per gram of polyester is obtained by heating the hydroxy or ester terminated polyesters.

14. A method as defined in claim 1 wherein the polyester emulsion is continually agitated at a temperature of at least about 90°C., for a period of time sufficient to obtain a particle size less than about 10 microns.

* * * * *